Dec. 4, 1934.   H. L. WILLIAMS   1,983,114
LOADING EQUIPMENT
Filed April 9, 1932
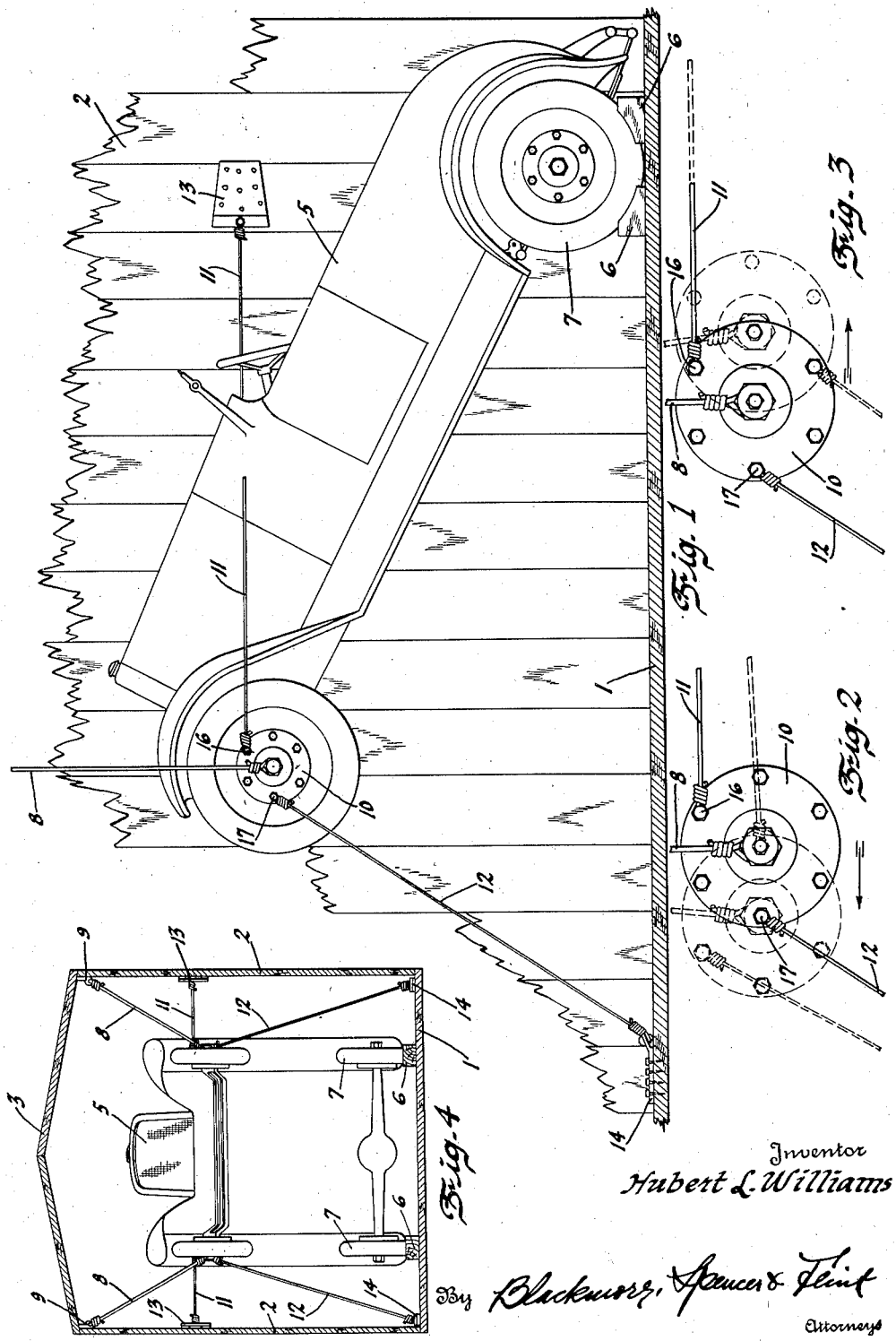
Inventor
Hubert L. Williams
By Blackmore, Spencer & Flint
Attorneys Patented Dec. 4, 1934

1,983,114

UNITED STATES PATENT OFFICE 1,983,114

LOADING EQUIPMENT

Hubert L. Williams, Detroit, Mich., assignor to General Motors Corporation, Detroit, Mich., a corporation of Delaware Application April 9, 1932, Serial No. 604,220

6 Claims. (Cl. 105—368)

This invention relates to shipping equipment and more particularly to an improvement in the loading of motor vehicles for transportation.

I have found that there is more likelihood of damage resulting during transportation to both the motor vehicle and the freight car or other carrier when attempts are made by the shipper to rigidly and immovably mount the vehicle in the car, than when the shipping equipment possesses a certain amount of flexibility or otherwise allows some floating movement of the vehicle in the car. With this in mind, I have provided equipment for loading automobiles, which while permitting slight relative movement, acts principally as a snubber to cushion jolts. This equipment to be more fully described hereinafter accommodates a limited range of movement with a greater freedom throughout a portion of the range and a gradually increasing resistance toward the end of travel, which effectually snubs or lessens the effects of forced movements and eliminates the sudden imposition of terrific stresses on the parts. In order that the snubbing action can take place to advantage, it is here proposed to suspend the weight or gravity load of the vehicle or at least a portion thereof, above the floor of the carrier and upon suitable tension members.

A preferred, but not necessarily the only embodiment of the invention, is illustrated in the accompanying drawing wherein Figure 1 is a longitudinal sectional view of a portion of a freight car, having an automobile loaded therein; Figures 2 and 3 are detail views illustrating the snubbing action that occurs upon movement in either direction; Figure 4 is a transverse section of the freight car looking toward the elevated end of the loaded vehicle.

Referring to the drawing, the freight car walls include a floor 1, right and left hand sides 2—2, and a roof 3. Within the car and mounted in an inclined position is a motor vehicle 5, having one end resting on the floor 1 and the other end elevated above the floor so as to permit a second automobile or other freight to be placed therebeneath. The lower end of the vehicle is braced against movement by means of a pair of wheel chocks 6—6, which engage the pneumatic tires 7 on opposite sides of the wheels. Suitable holddowns or other bracing devices may be employed in addition to the wheel blocks. At the opposite end of the vehicle 5, and at each side thereof, is a downwardly and inwardly extending tension element or cable 8, preferably consisting of a chain or wire, whose upper end is connected by a suitable anchor plate 9 to the upper portion of the car structure, either the roof 3 or the side wall 2 adjacent the roof. The lower end of the cable 8 is preferably looped around the spindle of the rotatable wheel hub or other rotatable member 10. If desired, the wheel can be removed from its hub. By means of the two suspension elements 8, the gravity load of the elevated end of the vehicle is carried in a fashion to permit the floating of the vehicle in a longitudinal direction, by reason of its momentum, when the carrier is severely jarred, particularly upon sudden starting or stopping, and the lower end of the vehicle is also permitted a limited movement, due to the resiliency of the pneumatic tires 7 and the character of the lower end connection with the carrier. To brace the vehicle and limit the extent of movement, use is made of a pair of guy wires 11 and 12, on each side of the vehicle, which diverge from the hub 10 and extend on opposite sides thereof outwardly to the car walls, where their remote ends are securely fastened by means of anchor devices 13 and 14, respectively. As shown in the drawing, the plate 13 is secured to the side wall 2 and the plate 14 to the car floor, but this is merely for the purposes of disclosure, and it is to be understood that the anchorage could be made to different walls.

From an inspection of Figure 4 it will be seen that each of the wires 8, 11 and 12 are inclined outwardly from the hubs, which not only affords maximum clearance for additional loading, but also braces the vehicle against lateral or sidewise movement. In some cases, however, it may be found desirable to employ an additional brace in the form of a wooden block or compression member (not shown) between opposite ends of the vehicle axle and the car side walls.

As shown in the drawing, the adjacent ends of the guy wires 11 and 12 are connected to the rotatable member 10 and for convenience the connection may be to two of the studs provided in the hub for the mounting of the wheel. The stud to which the cable 11 is fastened is indicated by the numeral 16, and that to which the cable 12 is fastened by the numeral 17. In the normal relation of the parts, as shown in Figure 1, the connections at 16 and 17 are out of line with the respective anchor plates 13 and 14 and the axis about which the member 10 rotates. By this arrangement both fore and aft longitudinal movement of the vehicle, relative to the carrier, is permitted within a small range and with a gradually increasing resistance to the movement toward opposite ends of the travel. That is to say, the axis of rotation can be moved away from either the anchorage points 13 or 14, which movement causes rotation of the member 10 to bring one or the other of the connections 16—17 into alinement with the axis of rotation and the respective anchorages. The movement of each connection is such that initially its path is closer to the direction of movement of the axis than it is in the final position of greatest resistance when its path of movement becomes approximately 90° to the direction of forced movement of the vehicle. Assuming, for example, that the forced movement is toward the right in Figure 1, the hub 10 is rotated in a counter-clockwise direction as the axis of rotation moves away from the anchorage 14, until the connection 17 approaches a line intersecting the axis and the connection 14, when further movement is rigidly resisted, the resistance building up or increasing as the connection 17 moves toward alinement. At the same time, the counter-clockwise rotation of the hub causes a movement of the connection 16 to take up slack in the guy 11 as the axis of rotation moves toward the anchorage 13. The same sort of a snubbing effect takes place when the forced movement is to the left, in which case the direction of rotation is clockwise bringing the connection 16 toward alinement with the axis of rotation and the anchorage 13 and moving the connection 17 to take up slack in the guy 12. The two actions are clearly indicated in Figures 2 and 3 where the neutral positions of the parts are indicated in full lines and the extreme positions they assume upon shock by broken lines.

To avoid the necessity for extreme accuracy in locating the anchorages and connections to obtain a precise action it is proposed for practical purposes to so assemble the equipment that a slight initial slackness is present in the guys 11 and 12.

I claim:

1. Loading equipment for shipping vehicles in a carrier including means to locate one end of the vehicle on the floor of the carrier, a tension element extending downward from the carrier and suspending the other end of the vehicle, a rotatable member on the vehicle, a second tension element connected to the rotatable member and extending non-radially from its axis of rotation and having a connection with the carrier such that on movement of the vehicle the said connection tends to rotate toward radial alinement of the second tension element with the said axis, and means cooperating with the rotatable member tending to restrain such rotation.

2. Loading equipment including a tension element adapted to suspend one end of a vehicle, a snubbing device comprising a rotatable member on the vehicle, a second tension element connected to the rotatable member and extending non-radially from its axis, and means cooperating with said rotatable member to maintain said relation of the second tension element to the rotatable member when the vehicle is in its normal position of suspension.

3. Loading equipment for shipping vehicles including a carrier, means to secure one end of the vehicle to the floor of the carrier, a tension element for suspending the other end of the vehicle, a rotatable member and a positioning member, a connection between one of said members and the vehicle, a connection between the other member and the carrier, a connection between said members which, in a normal position of suspension, is out of line with the respective connections of said members with the vehicle and with the carrier, but tends to rotate into such alinement when the vehicle is moved in one direction, and means cooperating with said rotatable member tending to restrain such rotation.

4. Equipment for loading a vehicle for shipment in a carrier including a pair of suspension devices adapted to support the opposite sides of a vehicle at one end, a rotatable member on each side of the vehicle, a pair of diverging tension elements on each side of the vehicle for action in opposition to each other and having at their remote ends connections to the carrier and at their adjacent ends connections to the rotatable member at points out of line with the carrier connections and the axes of the rotatable members in the normal position of suspension, whereby movement of the vehicle in one direction tends to rotate the connection of the rotatable member with one positioning element into radial alinement therewith, and movement of the vehicle in the other direction tends to reverse rotation thereof.

5. Equipment for loading a vehicle for shipment in a carrier including a tension element for suspending the vehicle off the floor of the carrier, a rotatable member on the vehicle, a restraining element fixedly anchored at one end to the carrier and connected at its opposite end to said member out of line with the fixed anchorage and the axis of rotation of the member, whereby movement of the vehicle which carries the axis away from the anchorage rotates the member to bring the connection toward alinement with the anchorage and said axes, and means cooperating with said rotatable member tending to restrain such rotation.

6. The method of loading a vehicle in a carrier for transportation which includes suspending an end of the vehicle in an elevated position, connecting a pair of oppositely extended tensioning members to a rotatable member on the suspended end of the vehicle out of alinement with its axis of rotation, and connecting the opposite ends of the tensioning members to fixed anchorages.

HUBERT L. WILLIAMS.